(12) United States Patent
Garwood et al.

(10) Patent No.: US 11,371,792 B1
(45) Date of Patent: Jun. 28, 2022

(54) GUN CONTROL UNIT AND METHOD OF USE

(71) Applicant: TMP Weapons, LLC, Reno, NV (US)

(72) Inventors: Tracy Warren Garwood, Reno, NV (US); Jaime Chait, Chandler, AZ (US)

(73) Assignee: TMP Weapons, LLC, Reno, NV (US)

( * ) Notice: Subject to any disclaimer, the term of this patent is extended or adjusted under 35 U.S.C. 154(b) by 0 days.

(21) Appl. No.: 17/575,494

(22) Filed: Jan. 13, 2022

(51) Int. Cl.
| | |
|---|---|
| F41A 19/64 | (2006.01) |
| H02K 1/17 | (2006.01) |
| H02K 1/22 | (2006.01) |
| G01P 15/08 | (2006.01) |
| G01K 13/00 | (2021.01) |
| G01P 3/50 | (2006.01) |
| F41A 19/69 | (2006.01) |

(52) U.S. Cl.
CPC ............. *F41A 19/64* (2013.01); *F41A 19/69* (2013.01); *G01K 13/00* (2013.01); *G01P 3/50* (2013.01); *G01P 15/0802* (2013.01); *H02K 1/17* (2013.01); *H02K 1/22* (2013.01)

(58) Field of Classification Search
CPC .......... F41A 19/64; F41A 19/66; F41A 19/67; F41A 19/69; F41A 19/04; F41A 19/03; F41A 19/58; F41A 19/59; F41A 19/60; F41A 19/61; F41A 19/62; F41A 19/63; F41A 19/65; G01K 13/00; G01P 3/50; G01P 15/0802; H02K 1/17; H02K 1/22
USPC .................................. 89/12, 1.41, 126, 132
See application file for complete search history.

(56) References Cited

U.S. PATENT DOCUMENTS

| | | | |
|---|---|---|---|
| 10,359,245 B2 * | 7/2019 | Abbott ...................... F41A 9/30 |
| 2010/0192759 A1 * | 8/2010 | Garwood ................ F41A 13/12 | 89/12 |
| 2011/0185883 A1 * | 8/2011 | Garwood ................ F41A 21/48 | 89/12 |
| 2016/0305740 A1 * | 10/2016 | O'Donnell ................ F41F 1/10 |
| 2022/0003515 A1 * | 1/2022 | Alvarez .................. F41A 19/67 |

\* cited by examiner

Primary Examiner — John Cooper
(74) Attorney, Agent, or Firm — Procopio Cory Hargreaves and Savitch LLP (57) ABSTRACT

A gun control unit for a M134 minigun firearm including an armature and a stator comprising at least one hardware processor; and one or more software modules that are configured to, when executed by the at least one hardware processor, independently control the armature; independently control the stator.

21 Claims, 9 Drawing Sheets

GUN CONTROL UNIT AND METHOD OF USE

FIELD OF THE INVENTION

The present invention relates to gun control units for firearms.

SUMMARY OF THE INVENTION

An aspect of the invention involves a solid state metal-oxide-semiconductor field-effect transistor (MOSFET) processor-enabled gun control unit (GCU) that controls an armature (or rotor assembly) and a stator (used to generate a magnetic field) of a M134 minigun firearm independently and incorporates feedback sensors as part of a closed loop control system. The GCU includes a microprocessor that controls the speed of a motor by using solid state technology that includes the MOSFET(s) and drivers. The MOSFET(s) are used in a half-bridge configuration and the microprocessor sends signals in a pulse width modulation (PWM) format. The duty cycle is used to control the amount of DC voltage delivered to the motor, and this controls its speed. PWM is also used on the stator and a solenoid (used as a clutch), as the duty cycle is decreased on those, the heat that is being dissipated can be reduced compared to GCUs of the past that were essentially two relays, one to control the armature and stator field and the other to control the solenoid.

Another aspect of the invention involves a GCU for a M134 minigun firearm including an armature and a stator comprising at least one hardware processor; and one or more software modules that are configured to, when executed by the at least one hardware processor, independently control the armature; independently control the stator.

One or more implementations of the aspect of the invention described immediately above includes one or more of the following: the GCU includes one or more solid state metal-oxide-semiconductor field-effect transistors (MOSFETs); one or more feedback sensors, and the one or more software modules are configured to, when executed by the at least one hardware processor, receive one or more feedback signals from the one or more feedback sensors and provide closed loop control of the armature and the stator based on the received one or more feedback signals from the one or more feedback sensors; the one or more feedback sensors include a speed sensor; the one or more feedback sensors include an accelerometer sensor; the one or more feedback sensors include a temperature; the one or more feedback sensors include a speed sensor, an accelerometer sensor, and a temperature sensor; the M134 minigun firearm includes a solenoid, and the one or more software modules are configured to, when executed by the at least one hardware processor, independently control the solenoid; the one or more software modules are configured to, when executed by the at least one hardware processor, send control signals in a pulse width modulation (PWM) format; the M134 minigun firearm includes an electric motor and the one or more software modules are configured to, when executed by the at least one hardware processor, control the speed of the electric motor by controlling the duty cycle of DC voltage to the electric motor, whereby decreasing the duty cycle decreases generated heat in the M134 minigun firearm; the M134 minigun firearm includes a three-phase brushless (BLDC) electric motor and hall effect sensors, and the one or more software modules are configured to, when executed by the at least one hardware processor, control the three-phase BLDC electric motor for each phase, decreasing generated heat in the M134 minigun firearm; the GCU includes one or more solid state metal-oxide-semiconductor field-effect transistors (MOSFETs); the GCU is configured to be manufactured with the rest of the M134 firearm; the GCU is configured to replace a two relay GCU including a first relay to control the armature and the stator, and a second relay to control the solenoid; a handle grip with hall-effect switches to control motor speed; a LCD configured to allow a user to monitor one or more different sensors and one or more different actuators; a LCD configured to allow a user to monitor one or more of number of rounds, speed, temperature, vibration, status of battery, wireless/satellite communication, GPS, view documents, and view history of events; a LCD configured to allow a user to save settings such as a predefined number of rounds, Max and Minimum speed, and enable an e-fence feature; a LCD having a capacitive or resistive touch screen to control different functions; and/or a plurality of external pushbuttons to control different functions.

Another aspect of the invention includes a method of retrofitting a M134 firearm comprising removing from the M134 firearm a two relay GCU including a first relay to control the armature and the stator, and a second relay to control the solenoid; replacing the two relay GCU of the M134 firearm with a GCU for a M134 minigun firearm including an armature and a stator comprising at least one hardware processor; and one or more software modules that are configured to, when executed by the at least one hardware processor, independently control the armature; independently control the stator.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 4A:
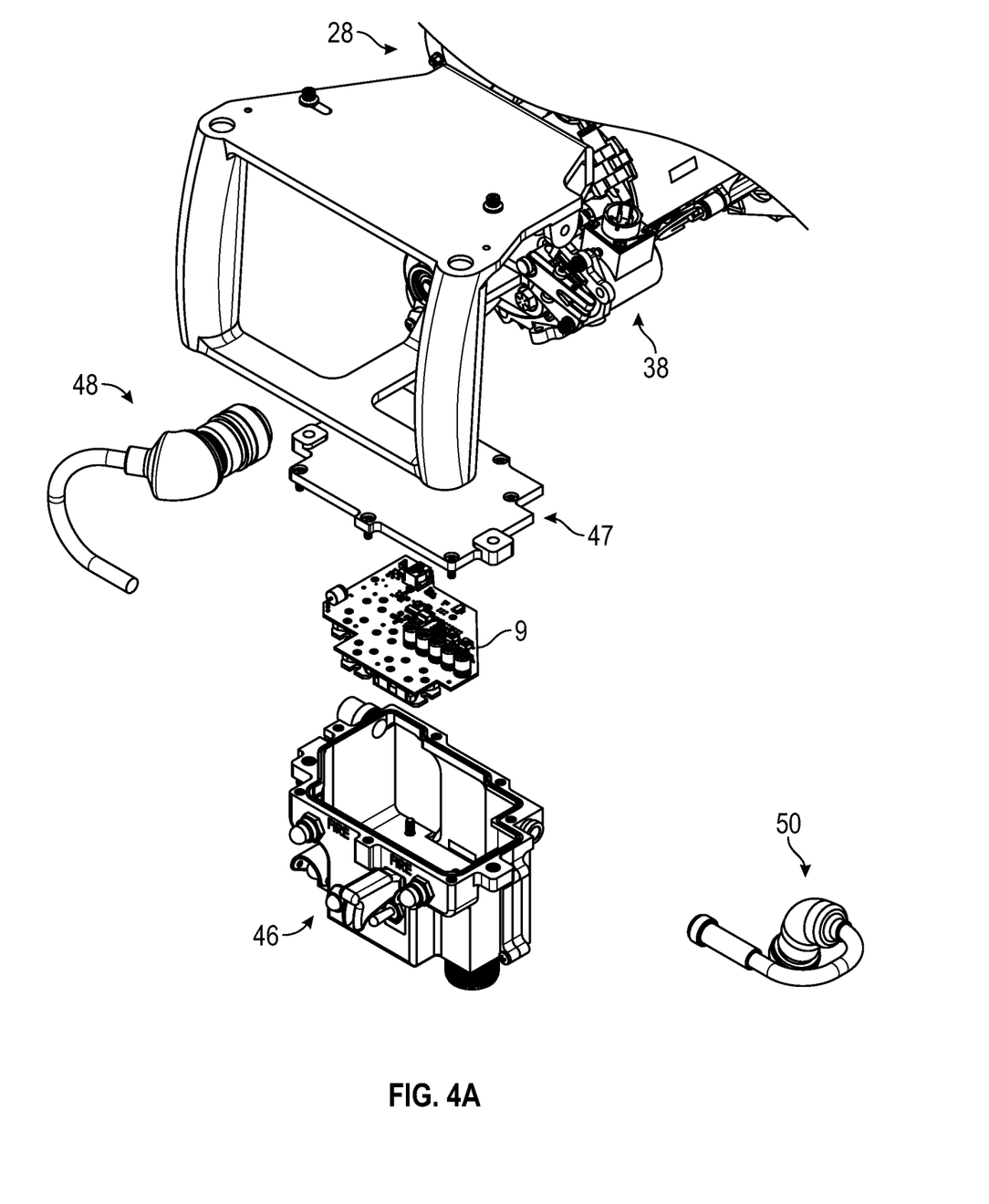
FIG. 4A is an exploded enlarged perspective view of a variety of components related to an embodiment of a MOSFET processor-enabled GCU of the M134 machine gun shown in FIG. 1
Figure 4B:
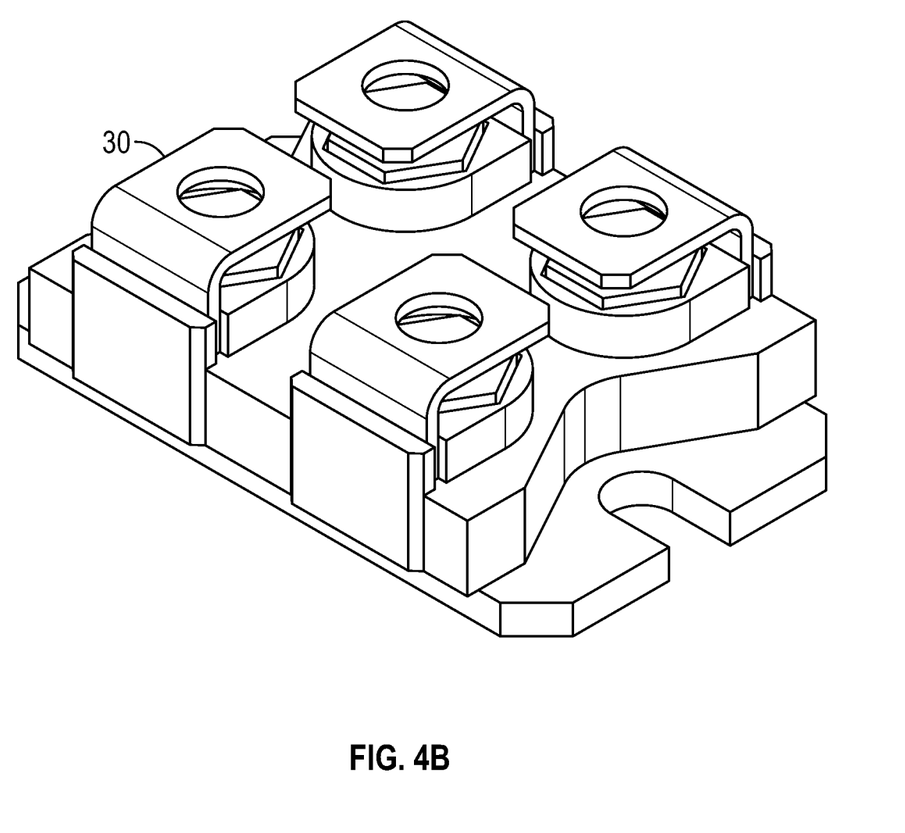
FIG. 4B is an enlarged perspective view of a MOSFET of the MOSFET processor-enabled GCU of FIG. A.
Figure 5:
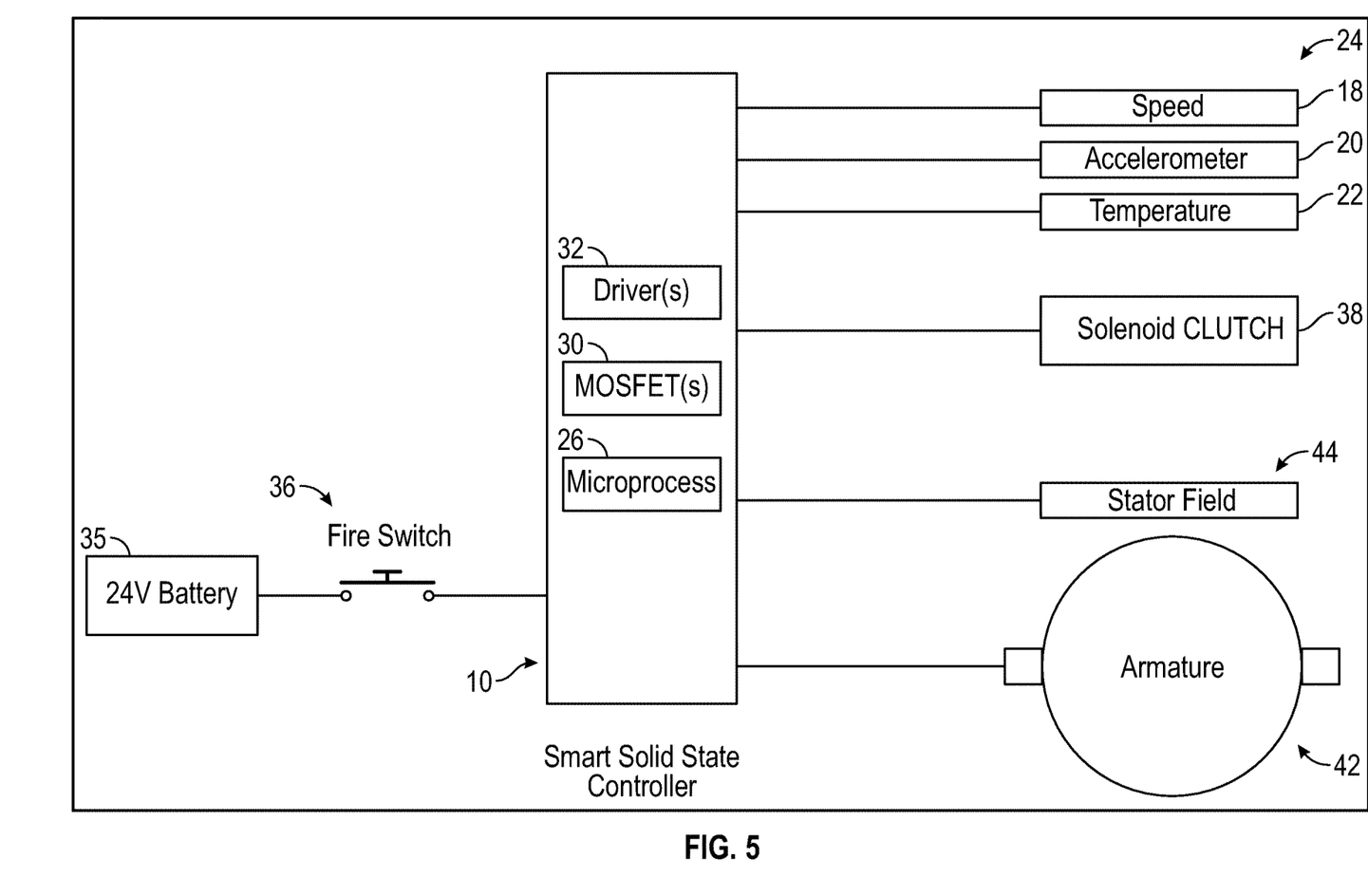
FIG. 5 is an electrical schematic of the MOSFET processor-enabled GCU of FIGS. 4A and 4B.

With reference to FIGS. 4A, 4B, and 5, an embodiment of a solid state metal-oxide-semiconductor field-effect transistor (MOSFET) processor-enabled gun control unit (GCU) 9 that replaces a relay-enabled GCU 10 of the prior art and controls an armature 12 and a stator 14 of a M134 minigun firearm 16 independently and incorporates feedback speed sensor(s) 18, accelerometer sensor(s) 20, and temperature sensor(s) 22 as part of a closed loop control system 24 will be described.

The GCU 9 includes a microprocessor 26 that controls the speed of a motor 28 by using solid state technology that includes MOSFET(s) 30 and driver(s) 32. The MOSFET(s) 30 are used in a half-bridge configuration and the microprocessor 26 sends signals in a pulse width modulation (PWM) format. The duty cycle is used to control the amount of DC voltage delivered to the motor 28, and this controls its speed. A 24V battery 35 supplies power as determined by a fire switch 36 to the GCU 9. PWM is also used on the stator 44 and a solenoid 38. As the duty cycle is decreased on those, the heat that is being dissipated can be reduced compared to GCUs of the past that were essentially two relays, one to control the armature and stator field and the other to control the solenoid. The two relay GCU of the prior art provided continuous voltage and, thus, maximum current and energy consumption.

The tradeoff of using PWM on the stator 14 and solenoid 38 to decrease dissipation is that the strength of the magnetic field is not as strong as with the two relay GCU of the prior art.

Figure 6:
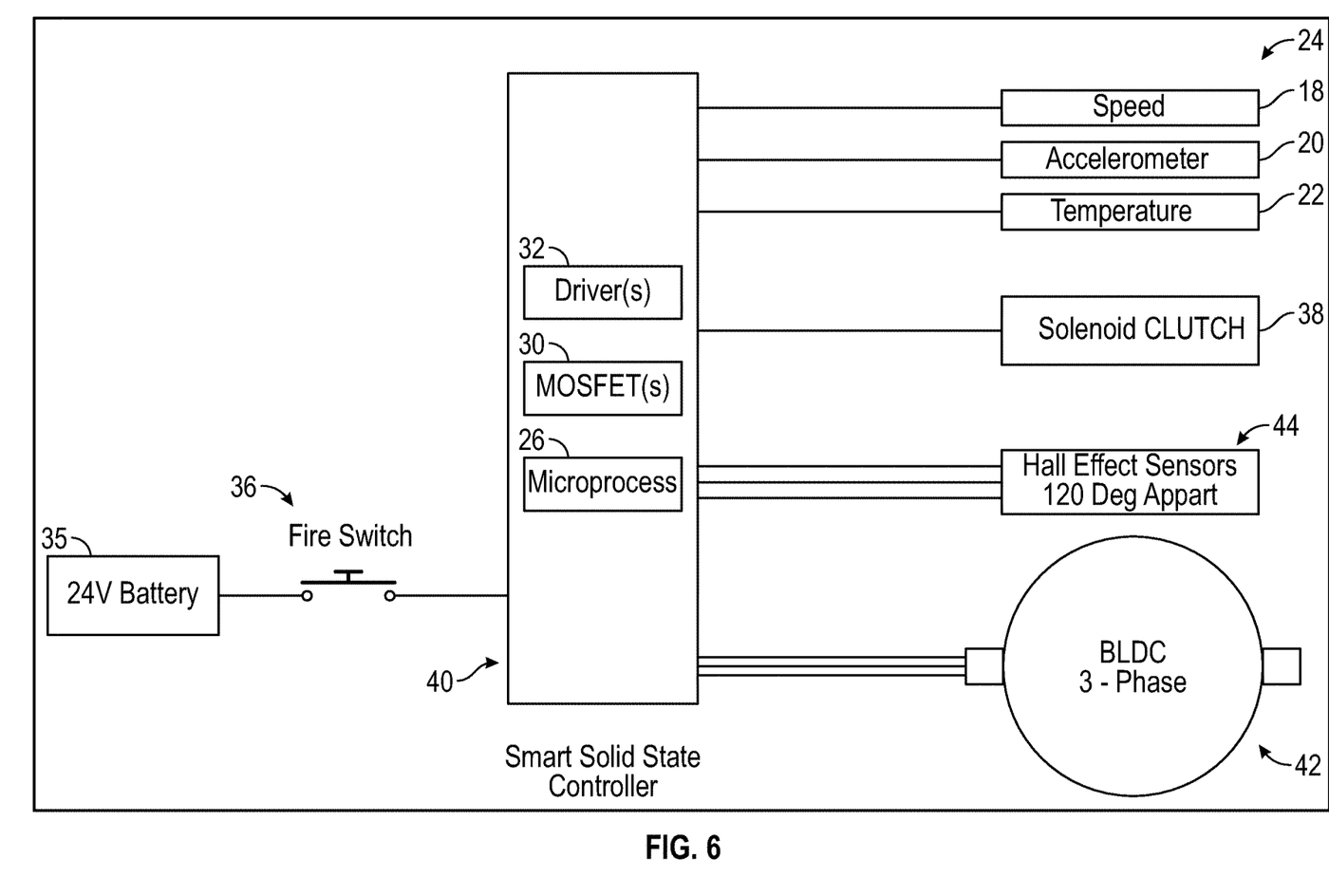
FIG. 6 is an electrical schematic of the MOSFET processor-enabled GCU along with a brushless DC (BLDC) motor with hall effect sensors of a M134 machine gun.

Accordingly, with reference to FIG. 6, another embodiment of a MOSFET processor-enabled GCU 40 is shown in conjunction with a three-phase brushless DC (BLDC) motor 42 with hall effect sensors 44 of a M134 machine gun. The GCU 40 is similar to the GCU 9, but instead controls the brushless DC (BLDC) motor 42 for each phase (A, B, and C). Using the MOSFET processor-enabled GCU 40 with the three-phase brushless DC (BLDC) motor 42 with hall effect sensors 44 helps to minimize the heat dissipation in the M134 minigun firearm 16.

Figure 7:
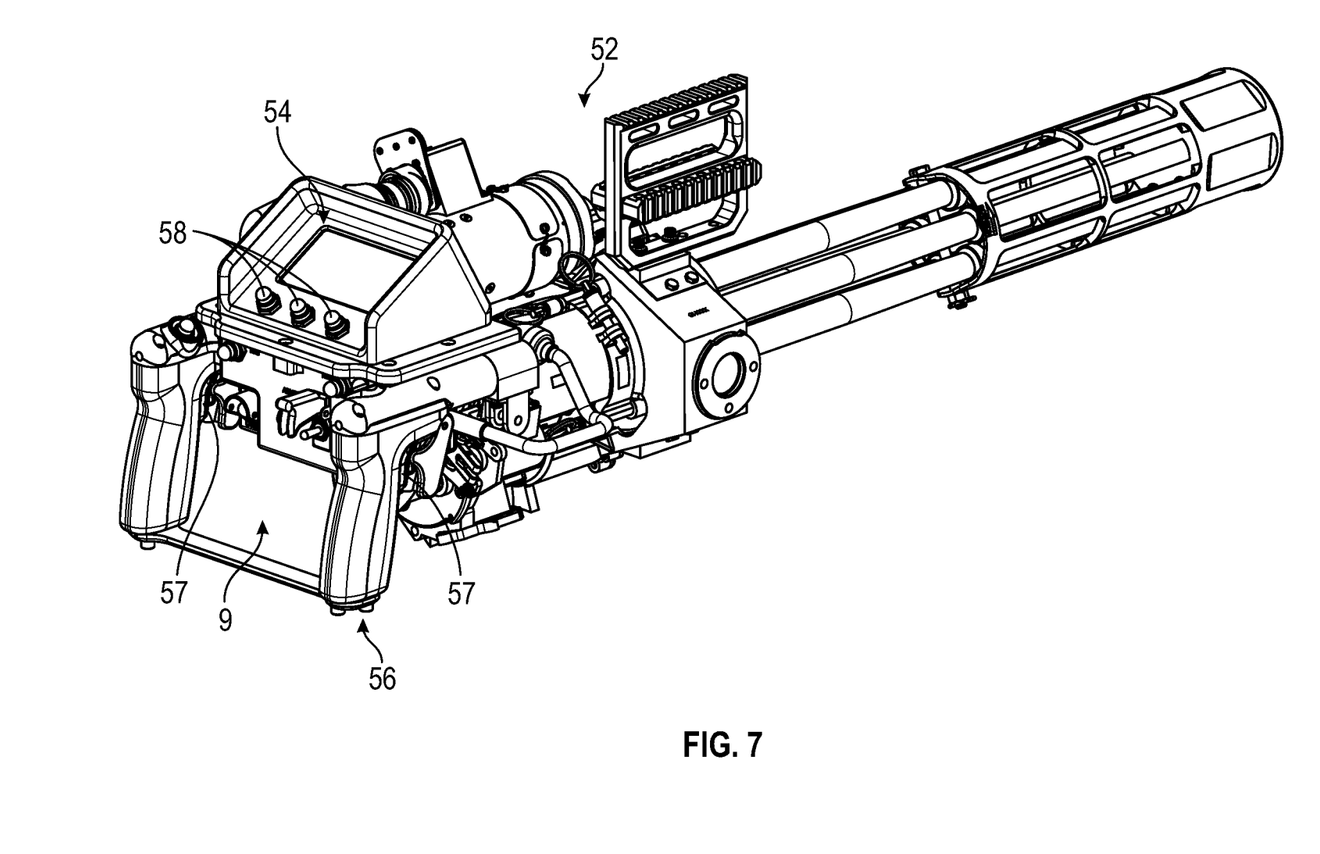
FIG. 7 is a perspective view of a M134 machine gun including a MOSFET processor-enabled GCU, a LCD, and handle grip with hall-effect switches to control motor speed.

FIG. 7 is a perspective view of a M134 machine gun or complete unit 52 including a MOSFET processor-enabled GCU 9, a LCD 54, and handle grip 56 with hall-effect switches 57 to control motor speed. The LCD 54 allows the user to monitor different sensor(s)/actuator(s) of the M134 machine gun 52. For example, but not by way of limitation, the LCD 54 allows the user to monitor number of rounds, speed, temperature, vibration, etc. and see the status of battery, wireless/satellite communication, GPS, etc. The LCD 54 is also used as a document viewer for, for example, a manual of operation, or to see the history of events. The LCD 54 also allows the user to save some settings such as, but not limited to, a predefined number of rounds, Max and Minimum speed, and to enable an e-fence feature. The LCD 54 includes color and graphics, allowing a user to perceive important information in a prompt matter. The LCD 54 includes a capacitive or resistive touch screen to control the different functions. The different functions can also be controlled using external pushbuttons 58 (e.g., three pushbuttons 58 disposed just below the LCD 54).

The hall-effect switches 57 are active transducers that provide a voltage proportional to the "travel" of the switch 57. This voltage is used by the controller to provide a variable speed. Software is used as a threshold switch for single-speed units. These types of switches are used on a hall effect technology, are more reliable than the mechanical switches since there are no moving parts and since it is based on magnetic field, they are more reliable in harsh environments (dust, water, temperature, oil, etc.)

Figure 1:
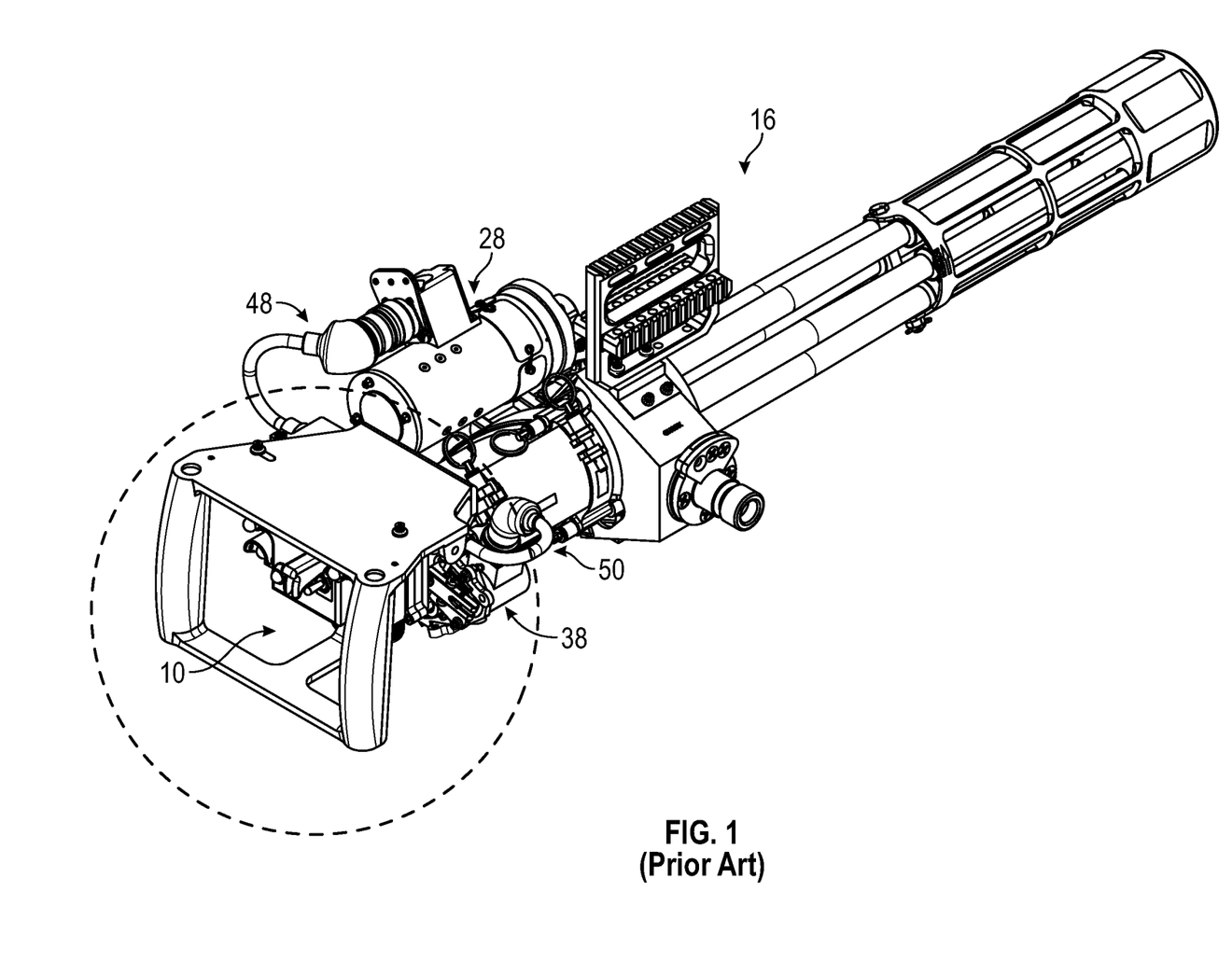
FIG. 1 is a perspective view of a M134 machine gun including a relay-enabled GCU of the prior art.
Figure 2:
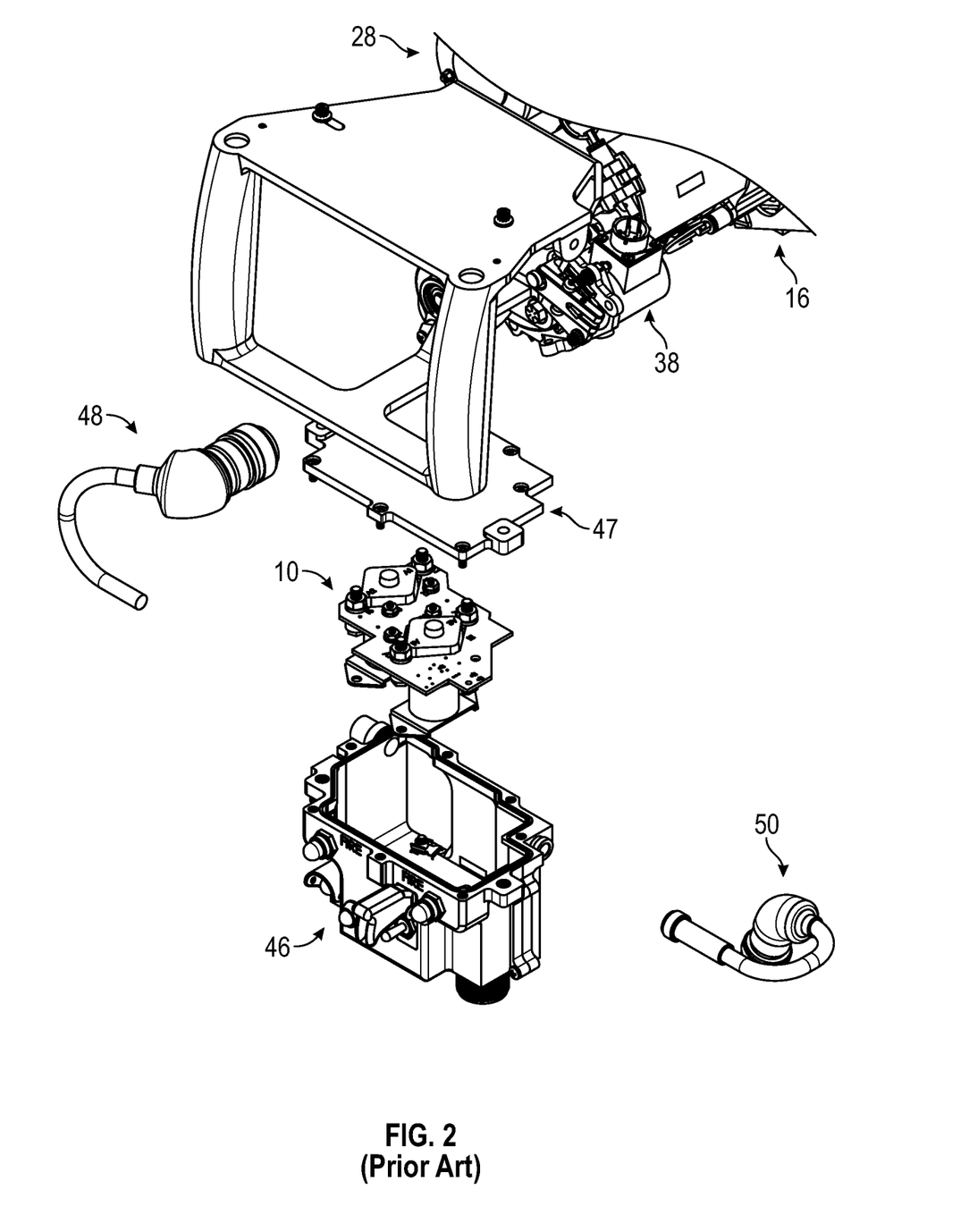
FIG. 2 is an exploded enlarged perspective view of a variety of components related to the relay-enabled GCU of the prior art of the M134 machine gun shown in FIG. 1.
Figure 3:
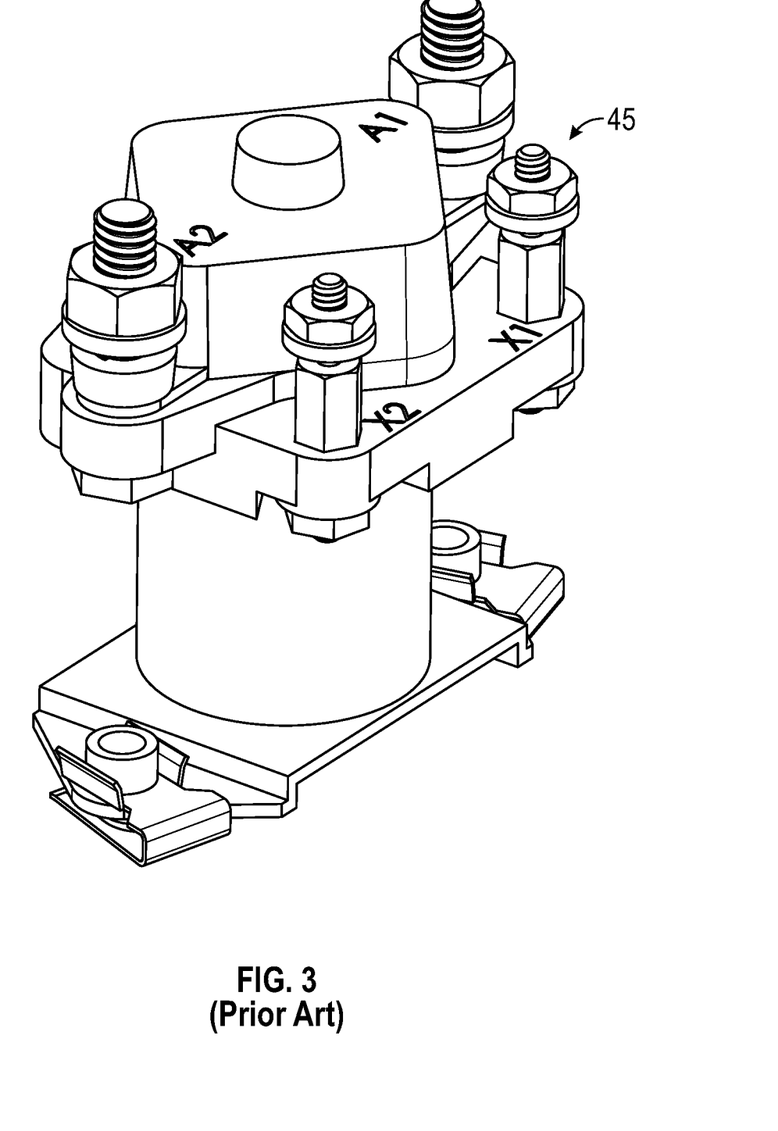
FIG. 3 is an enlarged perspective view of the relay-enabled GCU of the prior art that may be replaced with the MOSFET processor-enabled GCU of FIGS. 4A and 4B.

In use, either the M134 minigun firearm 16, 52 is manufactured with the MOSFET processor-enabled GCU 9, 40 or the two relay GCU 45 (FIG. 3) of the prior art is removed from the M134 minigun firearm 16 and replaced with the MOSFET processor-enabled GCU 9, 40, which is housed in GCU housing 46/lid 47. As discussed above with respect to FIG. 7, the M134 minigun firearm 16, 52 may also include a LCD 54, and handle grip 56 with hall-effect switches 57 to control motor speed. An existing motor cable and a clutch/solenoid cable are replaced with a motor cable 48 and a clutch/solenoid cable 50.

Figure 8:
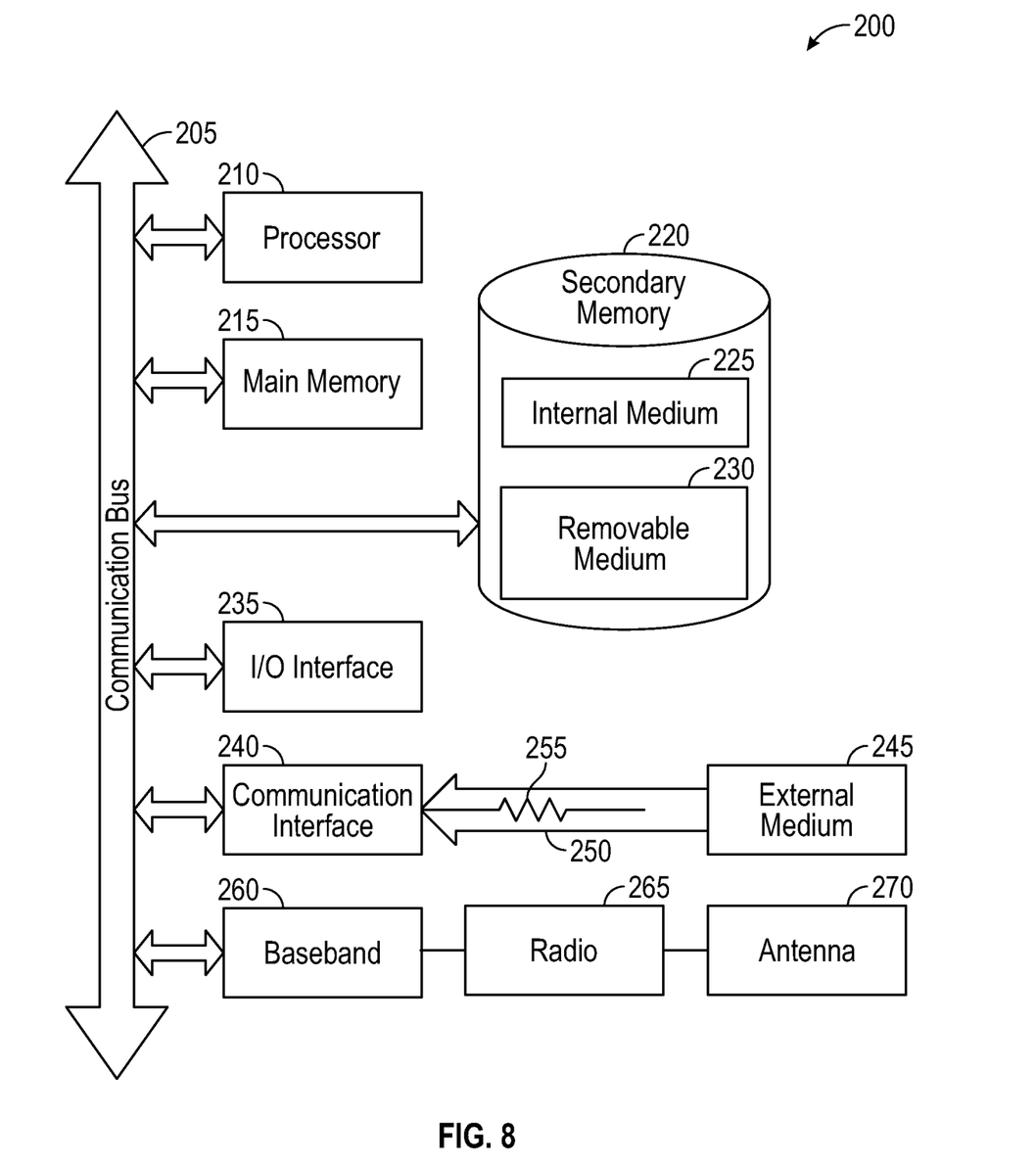
FIG. 8 is an example processing system, by which one or more of the processes described herein, may be executed, according to an embodiment.

FIG. 8 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of MOSFET processor-enabled GCU 9, 40, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, Calif., any of the processors available from Advanced Micro Devices, Incorporated (AMD) of Santa Clara, Calif., any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

It should be understood that the described processes may be embodied in one or more software modules that are executed by one or more hardware processors (e.g., processor 210), for example. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An M134 minigun firearm gun control unit (GCU) configured for use with an M134 minigun firearm, the M134 minigun firearm including an electric motor, the GCU comprising:
at least one hardware processor;
one or more software modules are configured to, when executed by the at least one hardware processor, control the speed of the electric motor by controlling the duty cycle of DC voltage to the electric motor.

2. The GCU of claim 1, wherein the M134 minigun firearm includes an armature and a stator, and the one or more software modules are configured to, when executed by the at least one hardware processor, independently control the armature; independently control the stator.

3. The GCU of claim 2, wherein the GCU includes one or more solid state metal-oxide-semiconductor field-effect transistors (MOSFETs).

4. The GCU of claim 2, further including one or more feedback sensors, and the one or more software modules are configured to, when executed by the at least one hardware processor, receive one or more feedback signals from the one or more feedback sensors and provide closed loop control of the armature and the stator based on the received one or more feedback signals from the one or more feedback sensors.

5. The GCU of claim 4, wherein the one or more feedback sensors include a speed sensor.

6. The GCU of claim 4, wherein the one or more feedback sensors include an accelerometer sensor.

7. The GCU of claim 4, wherein the one or more feedback sensors include a temperature.

8. The GCU of claim 4, wherein the one or more feedback sensors include a speed sensor, an accelerometer sensor, and a temperature sensor.

9. The GCU of claim 1, wherein the M134 minigun firearm includes a solenoid, and the one or more software modules are configured to, when executed by the at least one hardware processor, independently control the solenoid.

10. The GCU of claim 1, wherein the one or more software modules are configured to, when executed by the at least one hardware processor, send control signals in a pulse width modulation (PWM) format.

11. The GCU of claim 1, wherein the electric motor is a three-phase brushless (BLDC) electric motor and further including hall effect sensors, and the one or more software modules are configured to, when executed by the at least one hardware processor, control the three-phase BLDC electric motor for each phase, decreasing generated heat in the M134 minigun firearm.

12. The GCU of claim 11, wherein the GCU includes one or more solid state metal-oxide-semiconductor field-effect transistors (MOSFETs).

13. The GCU of claim 11, wherein the GCU is configured to be manufactured with the rest of the M134 firearm.

14. The GCU of claim 11, wherein the GCU is configured to replace a two relay GCU including a first relay to control the armature and the stator, and a second relay to control the solenoid.

15. The GCU of claim 1, wherein the M134 minigun firearm includes a handle grip with hall-effect switches to control motor speed.

16. The GCU of claim 1, wherein the M134 minigun firearm includes a LCD configured to allow a user to monitor one or more different sensors and one or more different actuators.

17. The GCU of claim 1, wherein the M134 minigun firearm includes a LCD configured to allow a user to monitor one or more of number of rounds, speed, temperature, vibration, status of battery, wireless/satellite communication, GPS, view documents, and view history of events.

18. The GCU of claim 1, wherein the M134 minigun firearm includes a LCD configured to allow a user to save settings such as a predefined number of rounds, Max and Minimum speed, and enable an e-fence feature.

19. The GCU of claim 1, wherein the M134 minigun firearm includes a LCD having a capacitive or resistive touch screen to control different functions.

20. The GCU of claim 1, wherein the M134 minigun firearm includes a plurality of external pushbuttons to control different functions.

21. A method of retrofitting a M134 firearm, comprising
removing from the M134 firearm the two relay GCU including the first relay to control the armature and the stator, and the second relay to control the solenoid;
replacing the two relay GCU of the M134 firearm with the GCU of claim 1.

* * * * *